United States Patent [19]
Burrell

[11] 3,803,421
[45] Apr. 9, 1974

[54] DRIVING MEANS FOR ALTERNATOR FOR RAILWAY CABOOSE LIGHTING SYSTEM

[76] Inventor: William Eldon Burrell, 2027 S.E. Harold St., Portland, Oreg. 97202

[22] Filed: Sept. 11, 1972

[21] Appl. No.: 287,816

[52] U.S. Cl. ........................................ 290/3, 290/1
[51] Int. Cl. ............................................ B61c 17/00
[58] Field of Search ................................ 290/1, 3

[56] References Cited
UNITED STATES PATENTS
3,544,802  12/1970  Burrell ................................ 290/1

Primary Examiner—G. R. Simmons

[57] ABSTRACT

The alternator of the electric lighting system in a railway caboose has a drive wheel which engages a specially surfaced transfer wheel riding on a periphery of a track wheel of the vehicle. The alternator is mounted on a hinged panel, the outer free end of which is supported by the transfer wheel through the intermediary of a cam shaft having an off-set portion so arranged that the weight transferred from the outer end of the panel causes the transfer wheel to have peripheral contact with the drive wheel of the alternator under all operating conditions.

1 Claim, 5 Drawing Figures

DRIVING MEANS FOR ALTERNATOR FOR RAILWAY CABOOSE LIGHTING SYSTEM

BACKGROUND OF THE INVENTION

In the past it has been customary to operate the alternator in the lighting system for a railway caboose by means of an endless belt driven from an axle connecting a pair of track wheels. The main objection to such arrangement is the fact that such a belt is likely to pick up snow, mud and other debris, causing slippage of the belt and interference with its proper operation. Also, such a belt is subject to rapid deterioration.

United States Pat. No. 3,544,802, issued Dec. 1, 1970, describes an improved alternator drive means in which the drive wheel of the alternator is driven by contact with a transfer wheel which rides on a track wheel of the caboose. Spring means, bearing against the alternator, maintains the drive wheel of the alternator in contact with the transfer wheel. The object of the present invention is to provide a simplified construction which accomplishes the same purpose in a similar manner but without requiring the use of any such spring means.

SUMMARY OF THE INVENTION

The alternator is firmly secured on a panel which is hingedly supported at one end by means mounted on a walking beam of the running gear assembly of the vehicle. The other end of the panel carries a cam shaft which extends out beyond the side of the panel and is formed with an off-set extension on which is mounted a transfer wheel riding on a track wheel of the vehicle. The transfer wheel also bears against the drive wheel of the alternator and the effect of the off-set or cam shaft mounting of the transfer wheel is to cause a constant force to be exerted by the weight of the panel and alternator, as carried by the transfer wheel, to cause the latter to bear against the drive wheel of the alternator regardless of wear occurring on the peripheries of the transfer wheel or alternator drive wheel.

Figure 1:
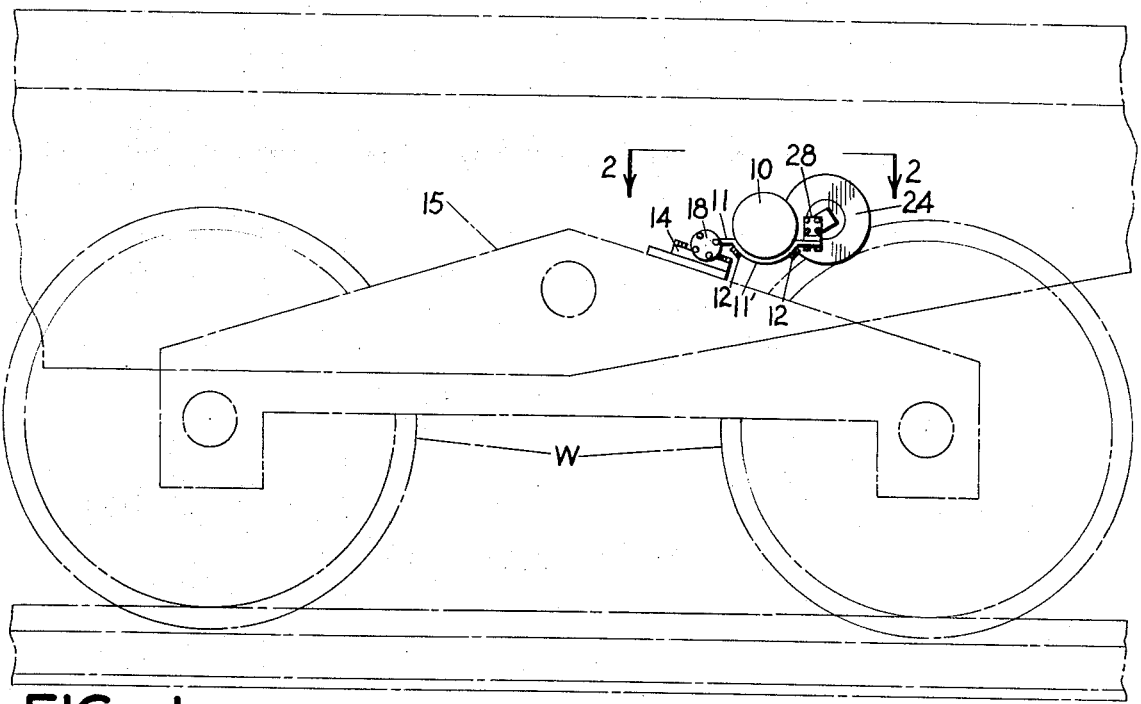
FIG. 1 is a side elevation of the alternator and drive assembly showing the same mounted in place on a walking beam of the running gear in a railway vehicle, the immediate portion of the vehicle running gear being indicated by broken lines.
Figure 2:
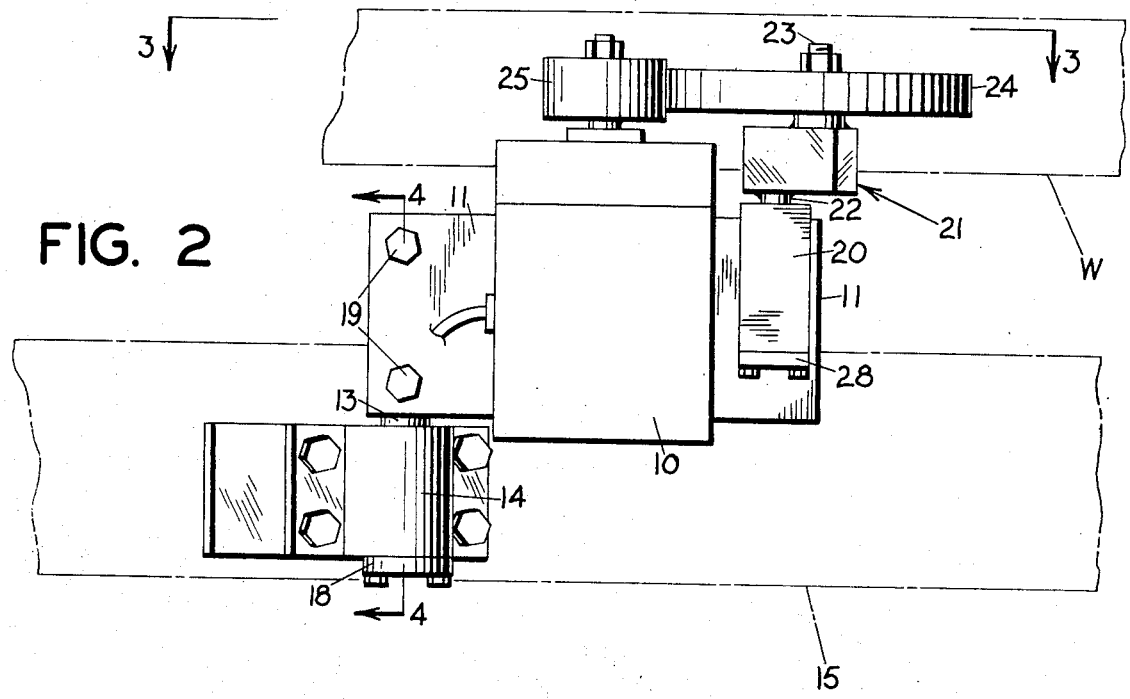
FIG. 2 is a top plan view of the alternator and its drive assembly taken on the line indicated at 2—2 of FIG. 1 but drawn to a much larger scale.
Figure 3:
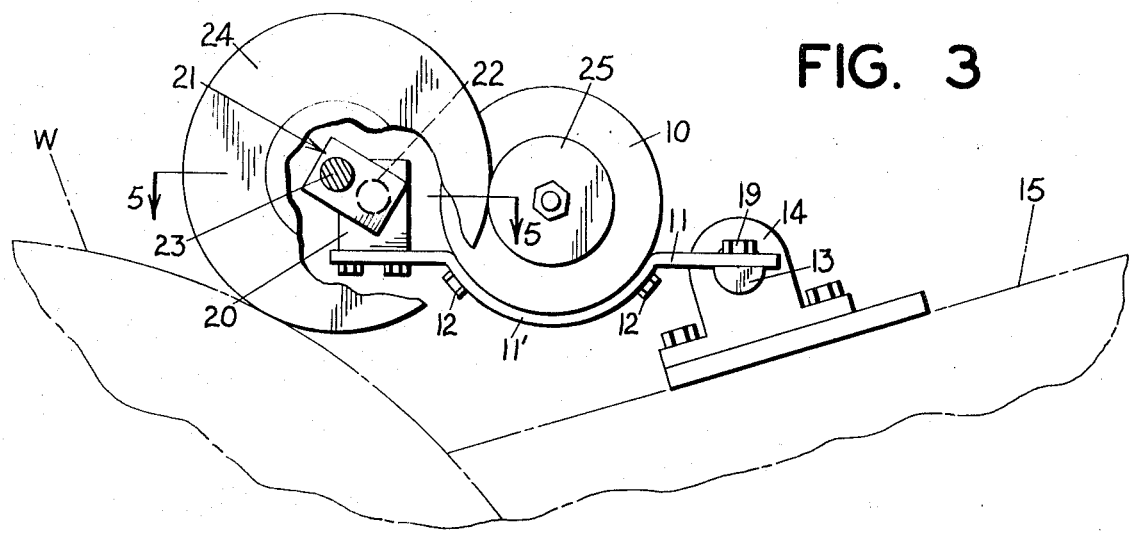
FIG. 3 is a side elevation of the alternator and driving assembly taken on line 3—3 of FIG. 2, and thus showing the opposite side from that shown in FIG. 1, this figure being drawn to the same scale as FIG. 2, with a portion of the transfer wheel broken away for clarity.

With reference first to FIGS. 1, 2 and 3, the alternator 10 for the lighting system of the vehicle is rigidly secured on a panel 11. Preferably, although not necessarily, the panel 11 is formed with a concave portion 11' (FIG. 3) serving as a cradle for the alternator, and the alternator is secured in place on the panel 11 by suitable screws or bolts indicated at 12 in FIG. 3. The panel 11 is hingedly supported at one end by being secured to a hinge shaft 13 which is rotatably mounted in a bearing housing 14 carried on a walking beam 15 (indicated in broken lines) of the vehicle running gear assembly.

Figure 4:
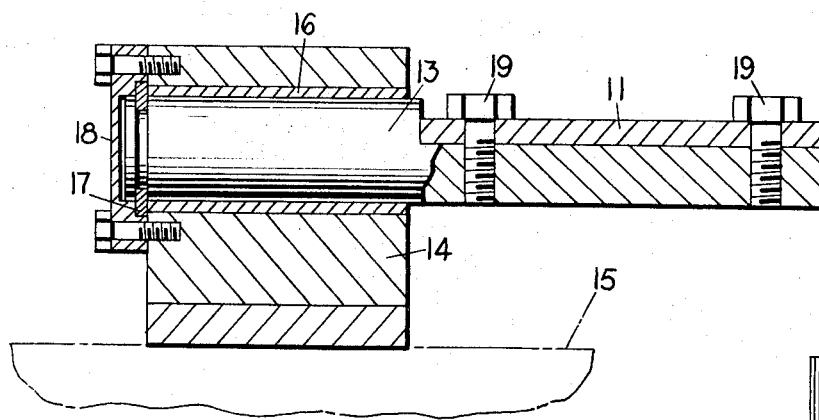
FIG. 4 is a section through the hinge mounting for the attached end of the panel on which the alternator is secured, this section being taken on the line indicated at 4—4 in FIG. 2, but drawn to a still larger scale.

As shown in FIG. 4, the supporting hinge shaft 13 for the end of the alternator-carrying panel 11 has a suitable bushing 16 in the bearing housing 14. The end of the shaft 13 beyond the bushing is formed with an annular groove which accommodates a split locking ring 17, and a retainer cap 18, secured by screws to the bearing housing extends over the locking ring and the end of the shaft. The bearing housing 14 is secured by screws to a base plate (FIG. 2) which in turn is welded to the walking beam 15 of the vehicle. Other means for mounting the hinge shaft for the panel 11 on the walking beam may be employed, but the construction illustrated is preferred for its simplicity. The panel 11 is secured to a flattened face on the hinge shaft 13 by suitable screws 19.

A bearing housing 20 for a composite cam shaft 21 is secured on the opposite or free end of the panel 11. The cam shaft 21 includes a first or main portion 22 (FIG. 5) rotatably mounted in the bearing housing 20, and outer off-set portion 23 on which are mounted the bearings for the hub portion of a rubber transfer wheel 24. The transfer wheel 24 rides on one of the wheels W of the vehicle, as shown in FIGS. 1, 2 and 3.

The alternator has a drive wheel 25 (FIGS. 2 and 3), and the alternator is so positioned that the periphery of the drive wheel 25 will be engaged by the periphery of the transfer wheel 24, and, as will presently be apparent, the arrangement is such that the transfer wheel constantly bears against the drive wheel of the alternator.

As best shown in FIG. 3, the outer off-set portion 23 of the cam shaft, on which the transfer wheel is mounted, is positioned in a direction away from the drive wheel of the alternator. With this arrangement the weight of the end of the panel 11 and alternator on the first portion 22 of the composite cam shaft, which weight is carried by the transfer wheel 24 through the intermediary of the off-set second portion 23 of the cam shaft, will exert a constant tendency to cause the cam shaft to rotate (in clockwise direction as viewed in FIG. 3). However, such rotation of the cam shaft is restricted by the peripheral contact of the transfer wheel 24 with the alternator drive wheel 25. Thus the load imposed on the transfer wheel as the transfer wheel rides on the vehicle wheel, holds the transfer wheel constantly against the alternator drive wheel, and this pressing engagement of the transfer wheel and the alternator drive wheel will be maintained even though surface wear of the peripheries of the transfer wheel or alternator drive wheel should occur. Thus the driving contact of the transfer wheel with the drive wheel of the alternator is maintained under all operating conditions without requiring the aid of any spring means to urge the alternator and its drive wheel toward the transfer wheel.

Figure 5:
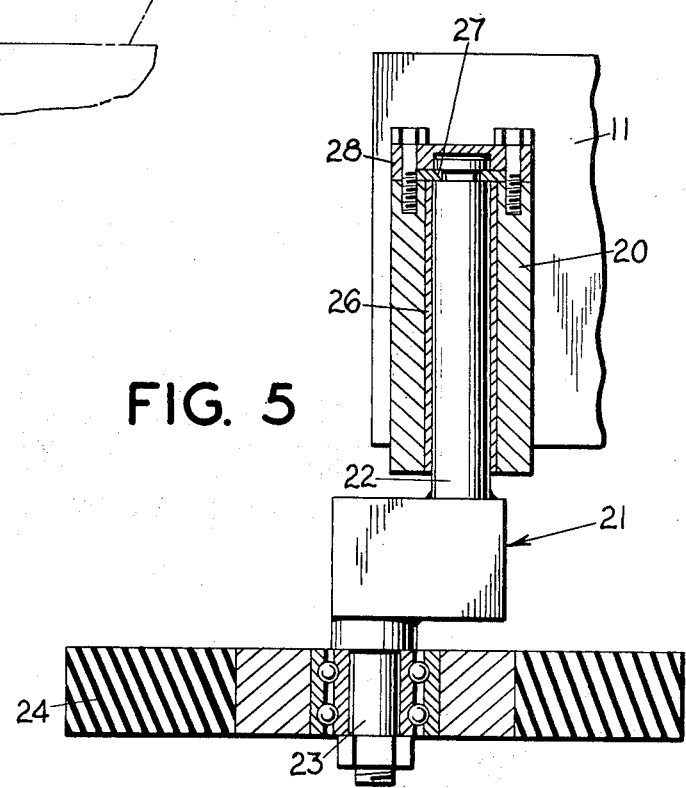
FIG. 5 is a section on the line indicated at 5—5 in FIG. 3, also drawn to a larger scale, showing the composite shaft, or cam shaft, on which the transfer wheel is mounted and showing the operating position of the transfer wheel and the off-set portion of the portion of the cam shaft on which it is mounted with respect to the free end of the alternator-supporting panel.

The composite cam shaft 21 has its first portion 22 mounted in the housing 20 on the free end of the alternator-carrying panel 11 as shown in FIG. 5. In this construction as illustrated, the portion 22 of the cam shaft is mounted in a bushing 26 in the housing 20 and the shaft is held against longitudinal movement in the housing 20 by a split locking ring 27 engaging an annular groove in the end of the shaft portion 22 and by an outer retainer cap 28 secured on the end of the housing 20.

Various minor modifications might be made in the construction illustrated and described without departing from the principle of having the weight of the alternator imposed on the transfer wheel in such manner that there is a constant thrust of the transfer wheel periphery against the periphery of the alternator drive wheel.

I claim:

1. A driving assembly for an alternator in an electric lighting system for a railway vehicle consisting of a panel hingedly mounted at one end on the walking beam of the vehicle, a shaft housing secured on the opposite free end of said panel, a cam shaft having a first portion rotatably mounted in said housing, a second portion of said shaft off-set from said first portion and extending beyond said housing, a transfer wheel mounted on said second off-set portion of said shaft, said transfer wheel riding on a wheel of the vehicle, an alternator secured on said hinged panel, a drive wheel for said alternator arranged for peripheral contact with the periphery of said transfer wheel, said second portion of said cam shaft off-set from said first portion in a direction away from the axis of said alternator drive wheel, whereby the weight of said free end of said panel and said alternator acting on said transfer wheel through the intermediary of said cam shaft will cause the periphery of said transfer wheel to bear constantly against the periphery of said alternator drive wheel regardless of normal wear of the peripheries of either wheel.

* * * * *